Jan. 15, 1935.  D. G. COON  1,988,373
PACKAGE FOR READY TO USE PIE CRUST DOUGH
Filed May 20, 1929

Inventor
DELLIE G. COON

By Sturtevant & Mason
Attorneys

Patented Jan. 15, 1935

1,988,373

UNITED STATES PATENT OFFICE 1,988,373

PACKAGE FOR READY TO USE PIE CRUST DOUGH

Dellie G. Coon, Chapin, Mich.

Application May 20, 1929, Serial No. 364,664

1 Claim. (Cl. 99—8)

My invention relates to new and useful improvements in a package for ready to use pie crust dough.

An object of my invention is to provide a package for ready to use pie crust dough with an inner wrapper so treated as to prevent souring and fungus growths thereon and an outer wrapper which is both moisture and oil proof, whereby the mass of dough may be kept conditioned for a considerable period of time and ready to be rolled, without further treatment, into proper shape for use.

In the drawing wherein for the purpose of illustration a preferred form of my invention is shown:—

Figure 1:
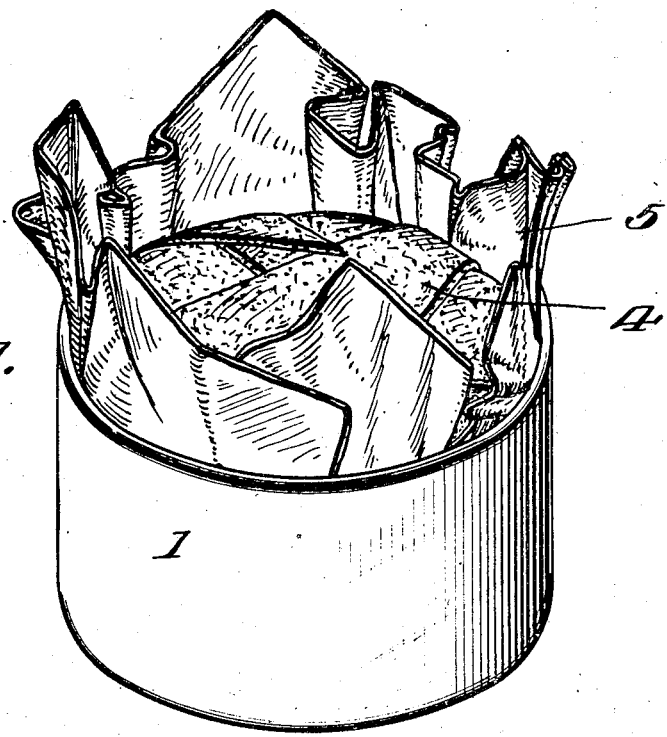
Fig. 1 is a perspective view of the package with the cover removed and the outer wrapper lifted to show the inner wrapper.
Figure 2:
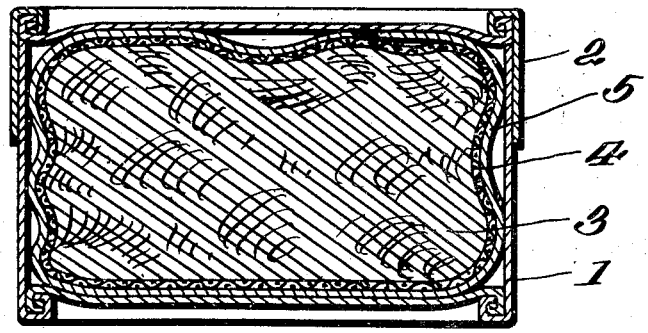
Fig. 2 is a view in section through the package, the wrapper being shown more or less diagrammatically.

The invention in its broadest aspect relates to the packaging of a lump of ready to use pie crust dough in such a manner that the dough will keep in perfect condition for use for a long period of time. The danger of spoilage lies in the action of mold and souring bacteria on the dough together with atmospheric conditions which might tend to harden or dry up the mass. To overcome any such deterioration, I have provided a package having a plurality of treated wrappers which preserve the dough and make the marketing of it in a usable form practical.

Referring more in detail to the drawing, a fibre can or container 1 is shown provided with a closure 2 having a flange adapted to frictionally engage the walls of the container in the well known manner for sealing the package. Fitted snugly within the container is shown a lump of dough 3 surrounded by two wrappers, an inner wrapper 4 and an outer wrapper 5. The inner wrapper 4 consists of a piece of muslin or other cloth which has been saturated with an acidulated aqueous agent. I have obtained excellent results by the use of vinegar, citric acid and horseradish. This wrapper is used while still fresh but nearly dry, as any moistening of the surface of the dough is undesired. The outer wrapper 5 may be of "Patapar", "Cellophane" or any suitable material which is impervious to both grease and moisture.

These two inner wrappers serve to keep the lump of dough conditioned ready for use. The wrapper saturated with the acidulous agent helps to retain the oil ingredients in the dough inasmuch as it makes close contact with the dough mass; it also prevents the formation of mold on the surface of the dough. The outer wrapper retains the moisture so that the lump thus wrapped may after quite a period of time be unwrapped and found to be in perfect condition for use.

In the wrapping of the package the mass of dough is placed on the inner wrapper which is folded snugly about the mass and the edge portions interfolded and lapped so that the entire surface of the dough mass comes in contact with this inner wrapper. The mass thus wrapped is placed on the outer wrapper which is likewise folded about the wrapped mass and its edge portions are interfolded and wrapped so that the entire wrapped mass is enclosed within this outer wrapper. The mass with its two wrappers is then placed in a container which is preferably of such dimensions as to snugly hold the wrappers in place about the mass.

It will be understood that various forms and shapes of containers may be used. I prefer the shape shown; a dough mass which, simply by rolling, is ready for use. It will be further understood that a single wrapper made of a material which resists the transfusion of air and grease, lined with cloth or muslin which has been properly acidulated to prevent the action of mold bacteria might be used instead of two separate wrappers.

While I have described the acidulous aqueous agent as consisting of vinegar, citric acid and horseradish, it will be understood that other ingredients may be used for accomplishing the result of preventing the formation of mold bacteria without departing from the spirit of the invention as set forth in the appended claim.

Having fully described my invention, what I claim as new and desire to secure by Letters Patent, is:—

A package for ready to use pie crust dough comprising a dough mass, an inner wrapper of fabric material saturated with an edible acidulous aqueous agent, folded snugly about the mass with the edge portions thereof interfolded and lapped so that the entire surface of the dough mass is in intimate contact with said inner wrapper for preventing souring, spoilage, bacteria and fungous growth thereon, an outer moisture and oil proof wrapper folded about the wrapped mass and enclosing the same, and a container within which the dough mass with the wrappers thereon is placed, said container being dimensioned so as to hold the wrappers in place and the fabric wrapper in contact with the dough.

DELLIE G. COON.